(12) United States Patent
Sevaux (10) Patent No.: US 10,607,131 B2
(45) Date of Patent: Mar. 31, 2020

(54) SELF ADHESIVE LABEL AND RFID INLAY

(71) Applicant: Avery Dennison Retail Information Services, LLC, Westborough, MA (US)

(72) Inventor: Alain Sevaux, Ennery (FR)

(73) Assignee: AVERY DENNISON RETAIL INFORMATION SERVICES, LLC, Mentor, OH (US)

( * ) Notice: Subject to any disclaimer, the term of this patent is extended or adjusted under 35 U.S.C. 154(b) by 0 days.

(21) Appl. No.: 15/372,981

(22) Filed: Dec. 8, 2016

(65) Prior Publication Data

US 2017/0161601 A1 Jun. 8, 2017

Related U.S. Application Data

(60) Provisional application No. 62/270,631, filed on Dec. 22, 2015, provisional application No. 62/264,635, filed on Dec. 8, 2015.

(51) Int. Cl.
| | | |
|---|---|---|
| *G06K 19/077* | (2006.01) | |
| *G06K 19/07* | (2006.01) | |
| *G09F 3/10* | (2006.01) | |
| *G09F 3/02* | (2006.01) | |
| *G09F 3/03* | (2006.01) | |

(52) U.S. Cl.
CPC ... *G06K 19/07722* (2013.01); *G06K 19/0723* (2013.01); *G06K 19/07745* (2013.01); *G09F 3/02* (2013.01); *G09F 3/0335* (2013.01); *G09F 3/10* (2013.01); *G09F 2003/0272* (2013.01)

(58) Field of Classification Search
CPC .......... G06K 19/02; G06K 19/00; G06K 5/00; G06F 17/00

USPC .................................. 235/488, 375, 487, 380
See application file for complete search history.

(56) References Cited

U.S. PATENT DOCUMENTS

| | | | | |
|---|---|---|---|---|
| 8,157,086 B1 * | 4/2012 | Gallegos | .............. | A45C 11/182 |
| | | | | 206/232 |
| 2005/0173541 A1 * | 8/2005 | Inoue | ............... | G06K 19/07728 |
| | | | | 235/492 |

(Continued)

FOREIGN PATENT DOCUMENTS

| | | |
|---|---|---|
| DE | 202011003520 | 5/2011 |
| FR | 2703573 | 10/1994 |

(Continued)

OTHER PUBLICATIONS

International Search Report and Written Opinion dated Mar. 14, 2017 for International Application No. PCT/US2016/065591 filed Dec. 8, 2016.

*Primary Examiner* — Edwyn Labaze
(74) *Attorney, Agent, or Firm* — Avery Dennison Retail Information Services, LLC (57) ABSTRACT

A self-adhesive label incorporating embedded trigger technology, such as an RFID inlay is disclosed. The label is manufactured of a rigid polyester, cardstock, paper, or other material that allows the label to be partially folded on itself. The sticky section of the label that is left out is then stuck to whatever packaging or product is to be labeled. Specifically, the self-adhesive label comprises a hole for hanging the label on a display rack. The RFID inlay is incorporated around the hole of the label and secured within the fold of the label when the label is partially folded on itself.

16 Claims, 6 Drawing Sheets (56) References Cited

U.S. PATENT DOCUMENTS

| | | | | |
|---|---|---|---|---|
| 2007/0187949 A1* | 8/2007 | Uruno | ............... | G09F 3/0288 283/105 |
| 2007/0221738 A1* | 9/2007 | Brod | ............... | G06K 19/07718 235/492 |
| 2008/0030344 A1* | 2/2008 | Weller | ............... | B65D 27/00 340/572.8 |
| 2008/0297310 A1* | 12/2008 | Onderko | ............... | G06K 19/07327 340/10.1 |
| 2009/0309733 A1* | 12/2009 | Moran | ............... | G06K 19/041 340/572.1 |
| 2010/0045025 A1* | 2/2010 | Cote | ............... | G06K 19/07749 283/81 |
| 2010/0276495 A1* | 11/2010 | Goldstein | ............... | B29C 44/1228 235/488 |
| 2011/0147467 A1* | 6/2011 | Choi | ............... | G06K 19/07327 235/492 |
| 2011/0226857 A1* | 9/2011 | Warther | ............... | G06K 19/04 235/488 |
| 2012/0056002 A1* | 3/2012 | Ritamaki | ............... | G06K 19/0723 235/492 |
| 2012/0234921 A1* | 9/2012 | Tiedmann | ............... | G06K 19/02 235/488 |
| 2013/0091747 A1* | 4/2013 | Ashpole | ............... | B42D 15/02 40/124.01 |
| 2014/0079894 A1* | 3/2014 | Buchbinder | ............... | G06K 19/025 428/32.11 |
| 2015/0008261 A1* | 1/2015 | Nitta | ............... | G06K 19/077 235/488 |
| 2015/0213739 A1* | 7/2015 | de Jong | ............... | G09F 3/0295 40/645 |
| 2016/0275769 A1* | 9/2016 | McIntosh | ............... | G08B 13/2414 |
| 2017/0233127 A1* | 8/2017 | Lim | ............... | B65C 1/02 206/459.5 |
| 2018/0303712 A1* | 10/2018 | Stafeil | ............... | A61J 1/18 |

FOREIGN PATENT DOCUMENTS

| | | |
|---|---|---|
| JP | 2006276389 | 10/2006 |
| WO | 2006/045395 | 5/2006 |
| WO | 2008090714 | 7/2008 |

* cited by examiner

SELF ADHESIVE LABEL AND RFID INLAY

CROSS-REFERENCE TO RELATED APPLICATIONS

The present application claims priority to U.S. Provisional Application No. 62/264,365, filed on Dec. 8, 2015 and U.S. Provisional Application No. 62/270,631, filed on Dec. 22, 2016, each of which is incorporated herein by reference in its entirety.

BACKGROUND

The present invention relates generally to the addition of a radio-frequency identification (RFID) transponder or other embedded trigger technology within a self-adhesive label hang tag assembly. The addition of the RFID transponder effectively integrates RFID directly into the label and then allows the label construction to be readily integrated with the packaging, such as garment packaging. The present subject matter is especially suitable for apparel items clothing, accessories such as belts, and other items. Accordingly, the present specification makes specific reference thereto. However, it is to be appreciated that aspects of the present inventive subject matter are also equally amenable to other like applications.

Radio frequency identification (RFID) tags are electronic devices that may be affixed to items whose presence is to be detected and/or monitored. The presence of an RFID tag, and therefore the presence of the item to which the RFID tag is affixed, may be checked and monitored by devices known as "readers" or "reader panels." Readers typically transmit radio frequency signals to which the RFID tags respond. Each RFID tag can store a unique identification number. The RFID tags respond to reader-transmitted signals by providing their identification number and additional information stored on the RFID tag based on a reader command to enable the reader to determine an identification and characteristics of an item.

Current RFID tags and labels are produced through the construction of an inlay which includes a chip connected to an antenna applied to a substrate. The inlay is then inserted into a single tag or label. These labels or tags are then printed by either conventional printing processes, such as flexographic processes, and then variable information may be printed either with the static information or singularly. The chips are then encoded in a printer which has a read/encoding device or separately by a reader/encoding device.

Another method of producing a RFID device directly on to a substrate, provides for the advancing of a substrate, coating the substrate with an adhesive and then deadening areas of the adhesive which will not be needed in connection with adhering the antenna to the substrate. Alternatively, the adhesive can be pattern coated on to the substrate in the shape and configuration of an antenna. Next, an aluminum or other metal foil is applied over the adhesive and adheres only in those areas were an exposed and tacky adhesive remains. The aluminum foil can be further cut such as through a rotary die cutter or laser cutting device to define the shape of the antenna and the remaining matrix of the aluminum is then removed allowing only the final antenna shape to be adhered to the substrate. A chip or strap is then applied over the contact ends of the antenna structure, such as with a dipole type antenna through the use of a conductive adhesive. A cover layer may be provided over the top of the chip or strap or alternatively over the entire area covered by the antenna.

However, RFID inlays can be difficult to attach to the exterior of clothing, accessories, and other items. Further, the RFID inlays may become detached with rough handling, or deliberately removed. If the RFID inlays become removed, the clothing, accessories, and other items can no longer be tracked.

What is needed therefore is a label, with an RFID inlay incorporated into the label. Thus, the RFID inlay cannot be easily removed and/or separated from the article, clothing, accessories, or other items, etc., which allows the items to be easily tracked and inventoried.

The present invention discloses a label with an RFID inlay incorporated in the label. The label or substrate is folded over on itself, securing the RFID inlay within the folds and preventing the RFID inlay from being easily removed and/or separated from the item. The RFID inlay provides loss prevention and enables tracking of the items, as well as promotes other actions for the user.

SUMMARY

The following presents a simplified summary in order to provide a basic understanding of some aspects of the disclosed innovation. This summary is not an extensive overview, and it is not intended to identify key/critical elements or to delineate the scope thereof. Its sole purpose is to present some concepts in a simplified form as a prelude to the more detailed description that is presented later.

The subject matter disclosed and claimed herein, in one aspect thereof, comprises a self-adhesive tag or label, such as a hang tag or "J" tag configuration incorporating embedded trigger technology, such as an RFID inlay. The tag or label can be manufactured in a flat form, similar to a standard self-adhesive label, using a low cost method, such as a roll to roll process. The tag or label substrate may be paper, cardstock, plastics such as PET, or other suitable materials. As the tag is initially supplied in a flat format it can be printed on using methods such as thermal transfer, inkjet or laser printing. In addition, the RFID device incorporated in the label may be programmed with information.

In a preferred embodiment, the self-adhesive tag or label comprises a hole for hanging the tag or label on a display rack. The RFID inlay is incorporated around the hole of the tag or label and secured within the fold of the tag or label when the tag or label is partially folded on itself.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and is intended to include all such aspects and their equivalents. Other advantages and novel features will become apparent from the following detailed description when considered in conjunction with the drawings.

DETAILED DESCRIPTION OF THE INVENTION

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof.

The present invention discloses a self-adhesive tag or label incorporating embedded trigger technology, such as an RFID inlay. The label is manufactured of film material such as paper, cardstock, PET or corrugated material or the like that allows the label to be partially folded on itself so as to enclose and protect the RFID device and create an aperture for hanging the label when attached to a product. The sticky part of the label that is left out is then stuck to whatever packaging or product is to be labeled. The RFID inlay provides loss prevention and enables tracking of the items, as well as promotes other actions for the user.

Figure 1:
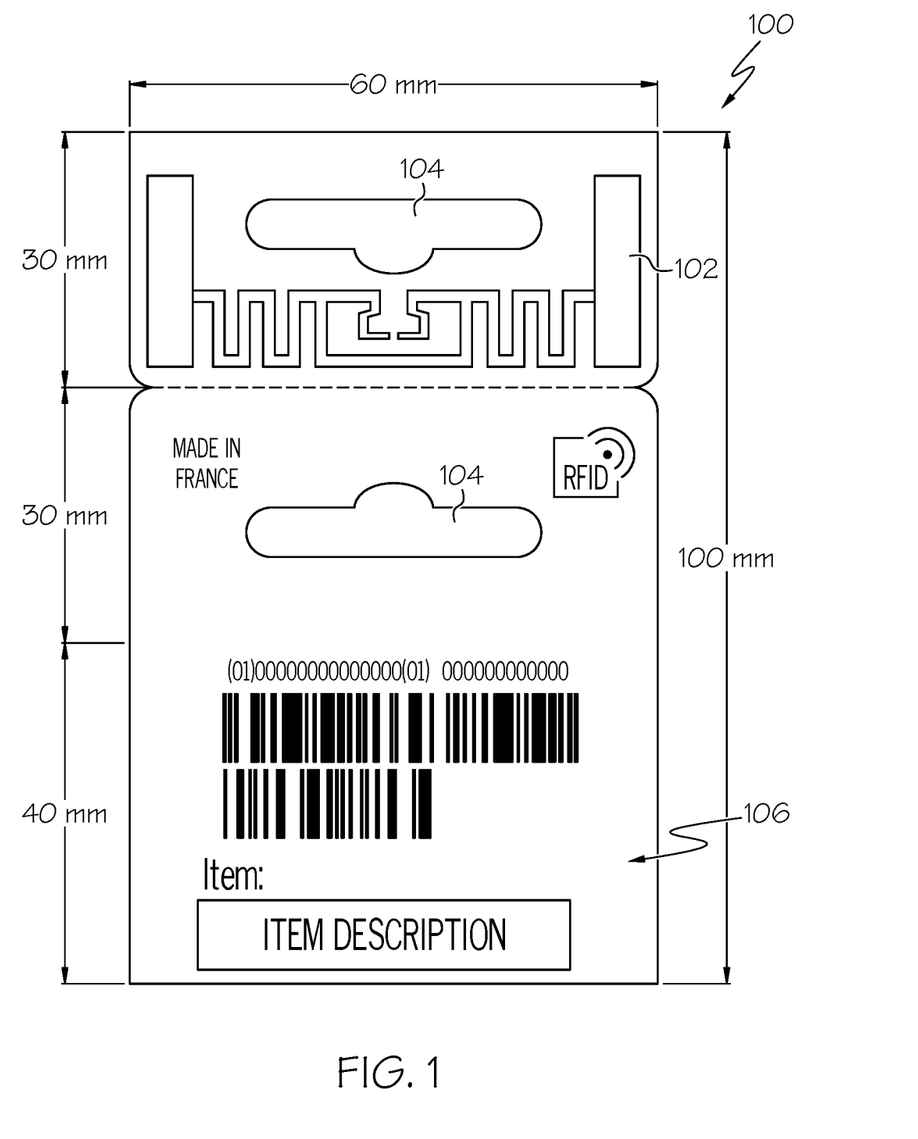
FIG. 1 illustrates a perspective view of the label of the disclosed system in accordance with the disclosed architecture.
Figure 2:
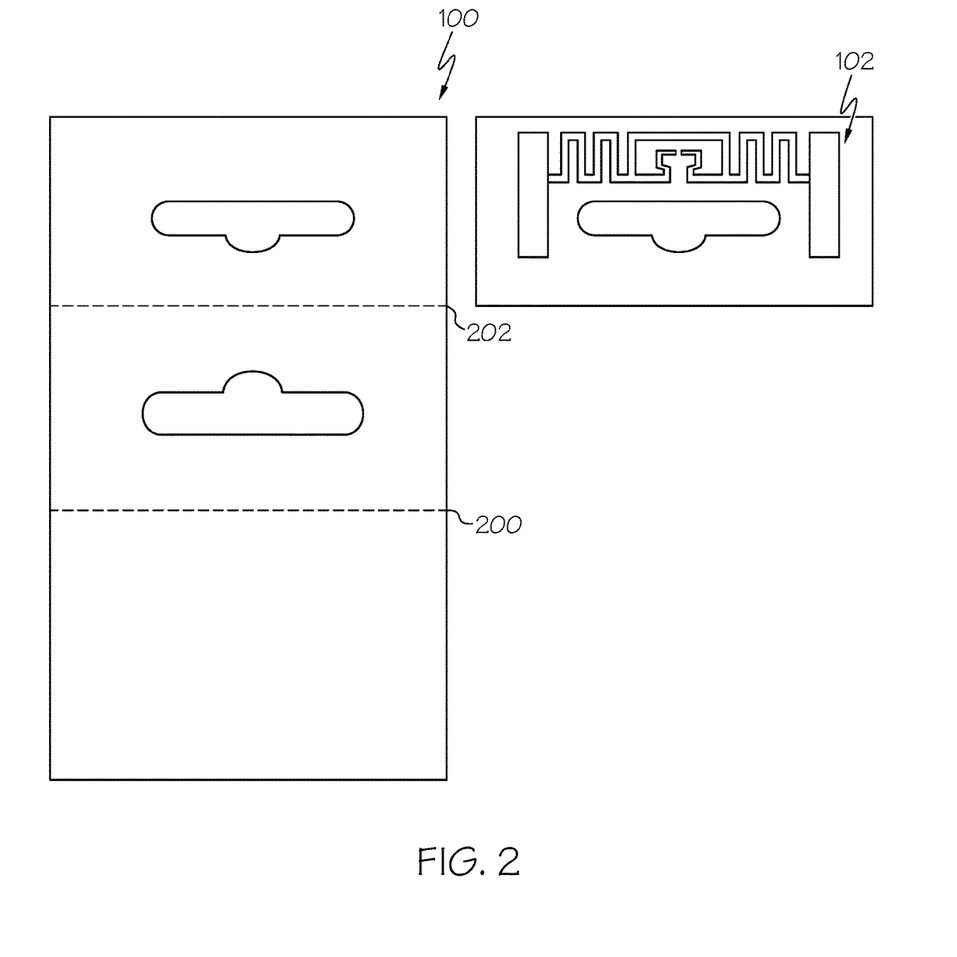
FIG. 2 illustrates a perspective view of the label and RFID inlay of the disclosed system in accordance with the disclosed architecture.

Referring initially to the drawings, FIG. 1 illustrates the label (or tag) 100 incorporating embedded trigger technology, such as an RFID inlay 102. The label or tag construction 100 is typically self-adhesive and manufactured of a stiff/rigid polyester material, paper, cardstock, plastics such as PET, or any other suitable materials that allows the label to fold on itself. The substrate has a top face with an adhesive layer adhered to the top face. The rigid or semi rigid material allows the label to be folded on itself, securing the RFID inlay 102 between the material folds. Typically, only the top portion of the label is folded on itself, leaving an adhesive, bottom (or sticky) section 106 which can be secured to an article or product to be labeled. Specifically, the label is generally 100 mm in length and 60 mm in width. Typically, 30 mm of the 100 mm overlap onto 30 mm to secure the RFID inlay within the folds, leaving approximately 40 mm of the label to be adhered to a product or item. The 40 mm of the label that remains can also have additional indicia, labeling, barcodes, etc. printed on it.

The label 100 also comprises at least one opening or hole 104 that allows the label to be hooked to a display. The hole can be any suitable size and shape as is known in the art to help the label 100 be secured to a display. Typically, the RFID inlay 102 is positioned and secured around the hole 104 of the label 100. The RFID inlay 102 can be secured via any suitable method as is known in the art. Once secure, the label 100 is folded over on itself, securing the RFID inlay 102 within the folds and preventing the RFID inlay 102 from being easily removed and/or separated from the label 100.

The label or tag configuration of the present invention can be used in any number of applications. An exemplary embodiment is for use in the apparel field of use such as with garments or accessories. The present invention facilitates the packaging and display of the garment or accessories (e.g. socks, hosiery, underwear, scarves, belts or the like which can often be displayed from a vertical consumer display and suspended from hooks.

In a further embodiment, the chip of the RFID device can be encoded with information relating to the product that it will be connected with and then the substrate can be printed with high quality graphics or other information relating to the retailer, brand owner or manufacturer of the product. The printing may be done before or after the application of the RFID device. Referring generally to FIGS. 2-5, it is shown how the RFID inlay 102 is attached and secured to the label 100. Specifically, FIG. 2 discloses the label 100 cut by a $CO_2$ laser or other suitable means for cutting the label 100. The label 100 is cut by the laser into a layer of adhesive ticket material, or other suitable material as is known in the art. An additional perforation 200 can also be added to help with manual alignment. The first perforation 202 is needed to allow the label 100 to be folded over on itself. For example, the label 100 is generally 100 mm in length and 60 mm in width. Typically, 30 mm from the top 204 of the label 100 is positioned the first perforation 202. Thus, 30 mm of the 100 mm overlap onto 30 mm to secure the RFID inlay 102 within the folds, leaving approximately 40 mm of the label 100 to be adhered to a product or item.

Figure 3:
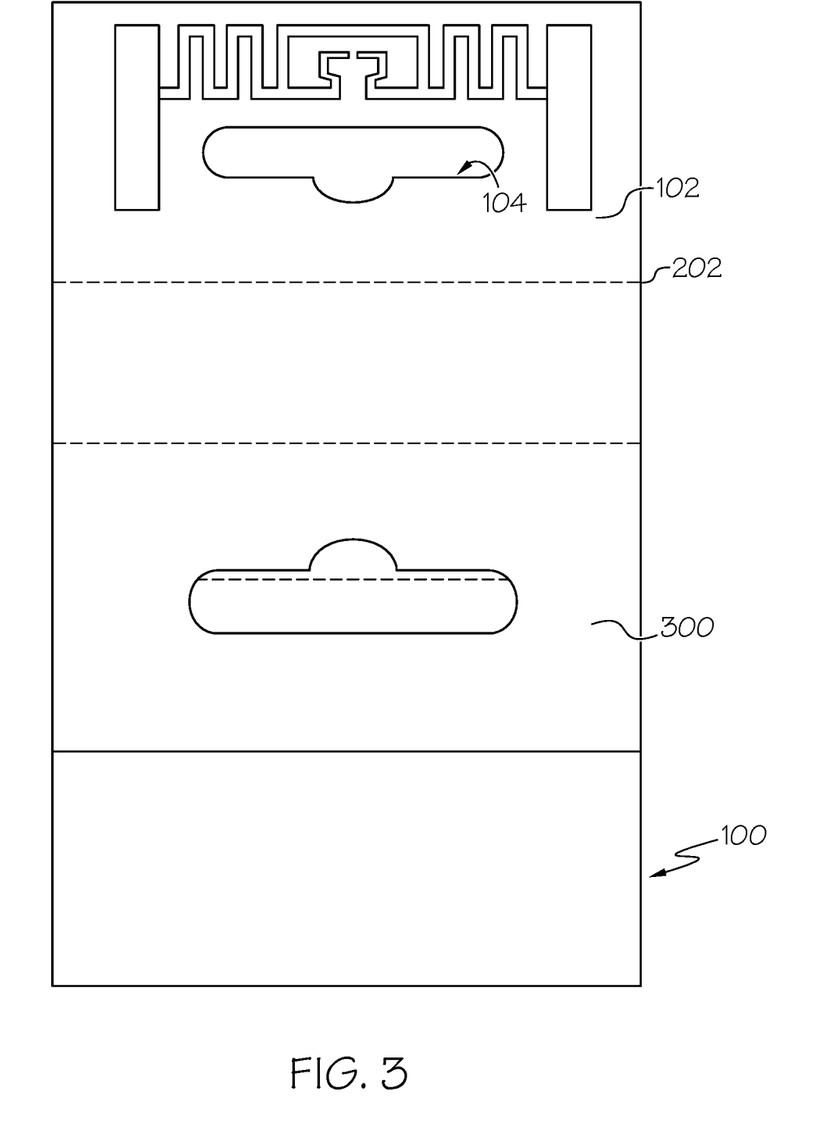
FIG. 3 illustrates a perspective view of the RFID inlay mounted onto the label with the release liner peeled back in accordance with the disclosed architecture.

FIG. 3 discloses the RFID inlay 102 mounted onto the label 100. Typically, the label 100 also comprises any suitably sized and shaped hole 104 that allows the label to be hooked to a display. The RFID inlay 102 is positioned and secured around the hole 104 of the label 100. The RFID inlay 102 can be secured via any suitable method as is known in the art. Typically, the RFID inlay 102 is incorporated into an adhesive layer, and the release layer 300 of the adhesive layer is removed and the RFID inlay 102 is secured to the label 100, around the hole 104. Once secure, the label 100 is folded over on itself at the first perforation 202, securing the RFID inlay 102 within the folds and preventing the RFID inlay 102 from being easily removed and/or separated from the label 100.

Figure 4:
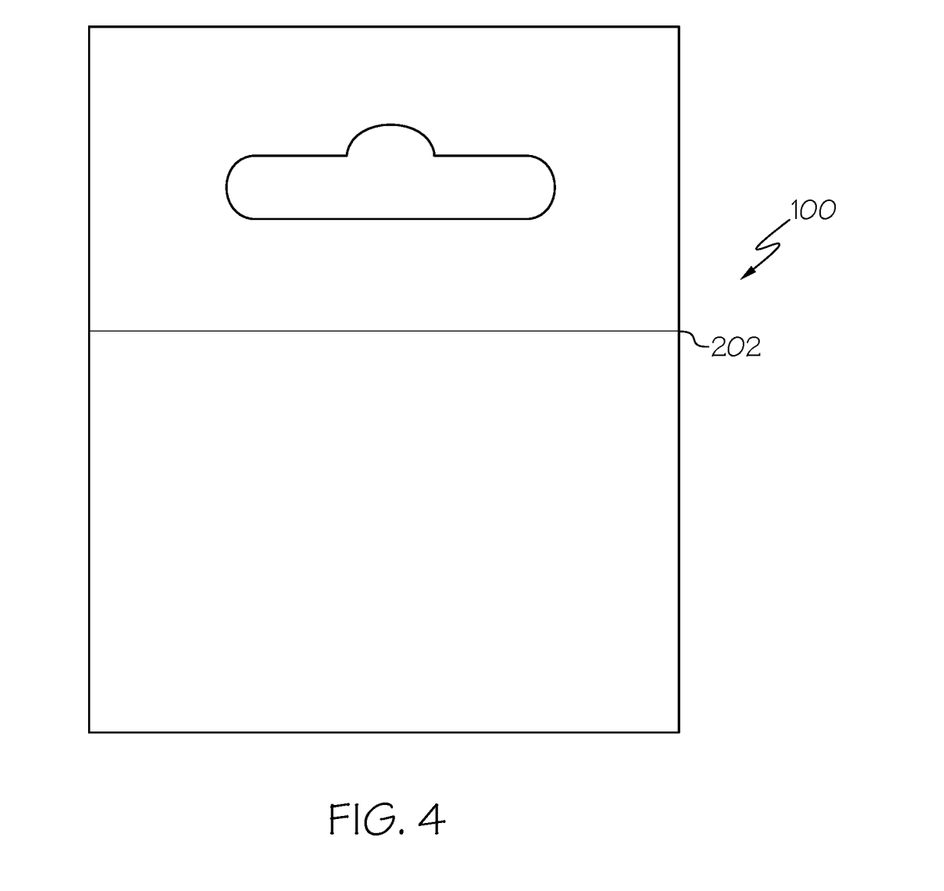
FIG. 4 illustrates a perspective view of the label folded over on itself in accordance with the disclosed architecture.
Figure 5:
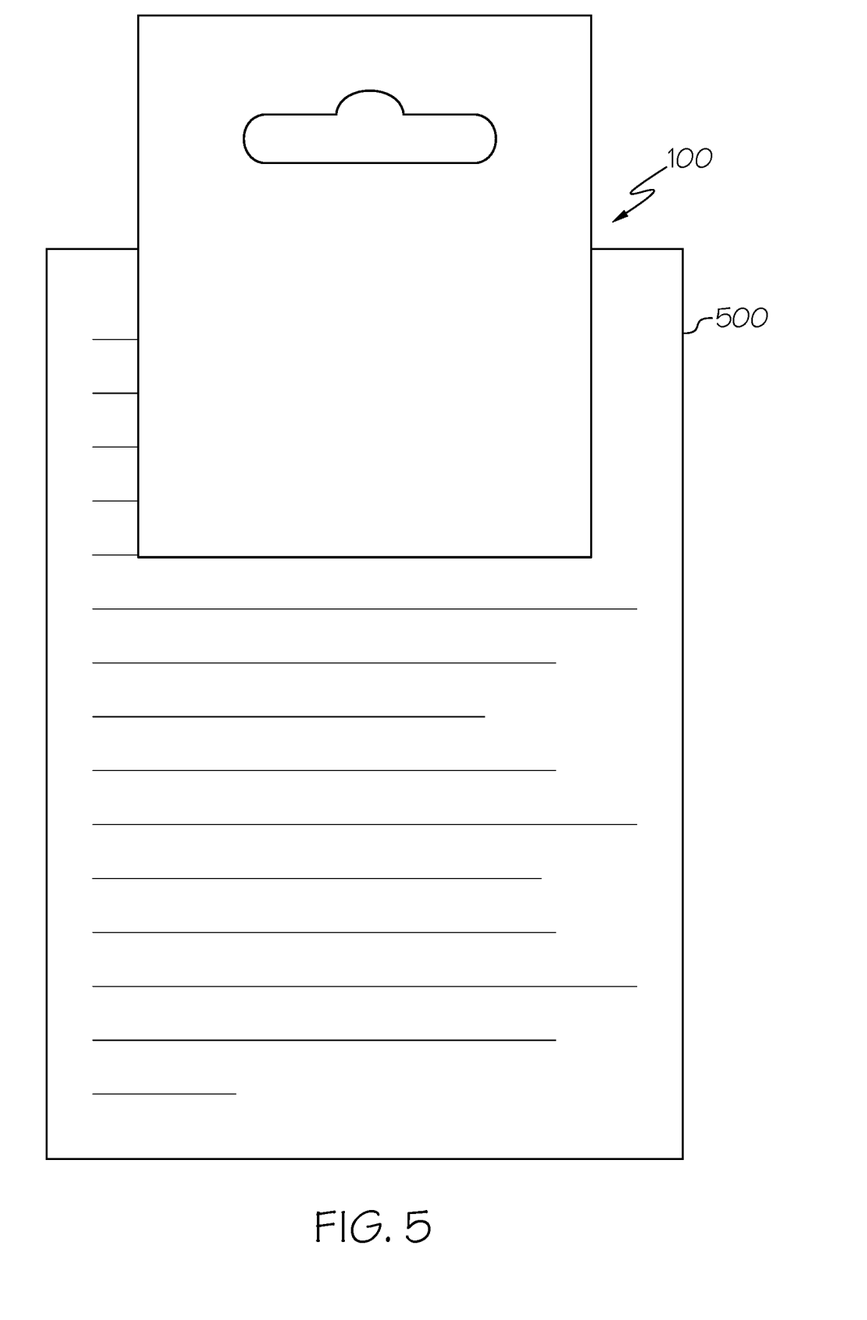
FIG. 5 illustrates a perspective view of the label secured to a box in accordance with the disclosed architecture.
Figure 6:
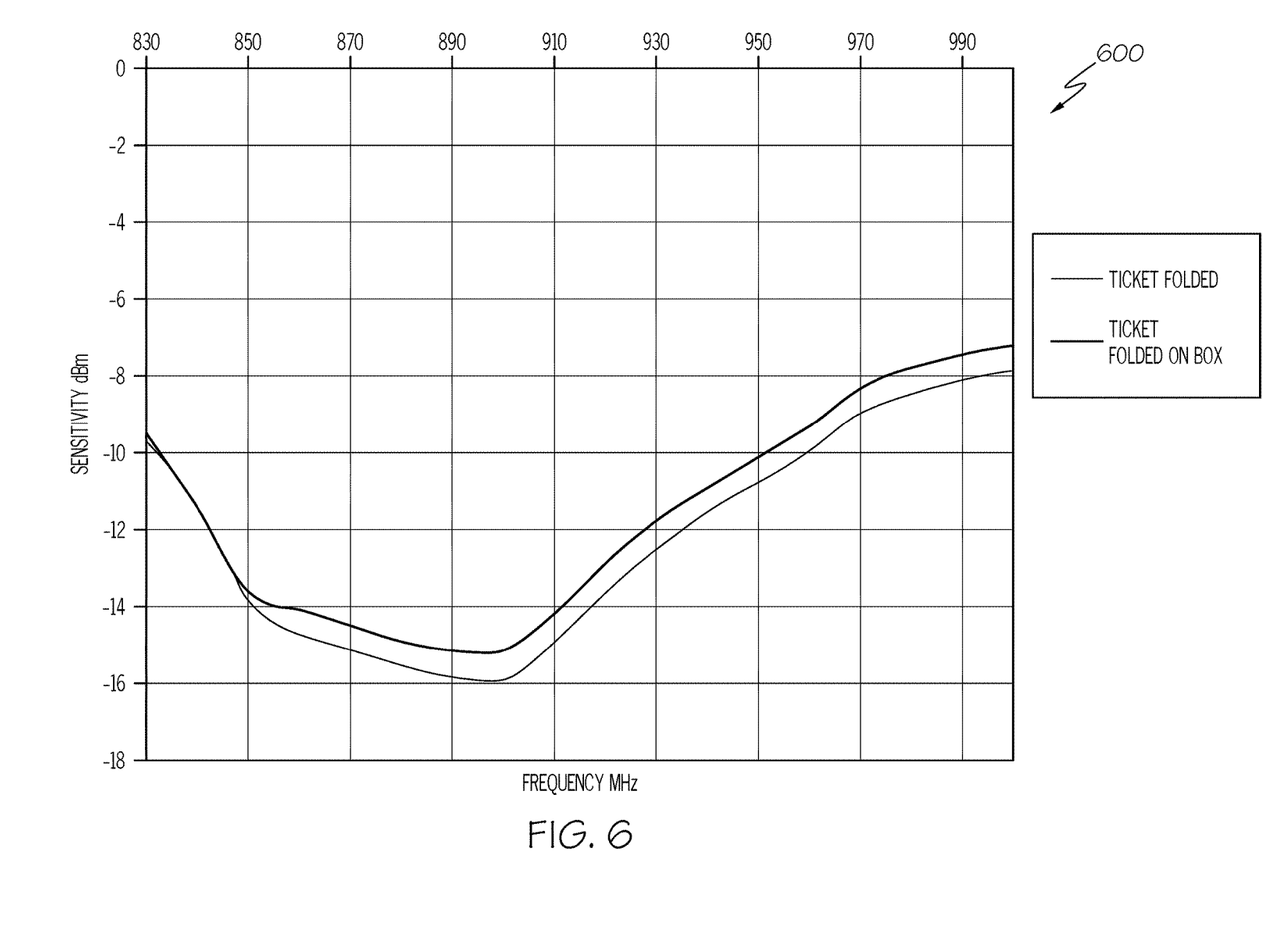
FIG. 6 illustrates a graph displaying the differences between the label being folded securing the RFID inlay within, and the label and RFID inlay being secured to an item in accordance with the disclosed architecture.

FIG. 4 discloses the label 100 folded over on itself at the first perforation 202, securing the RFID inlay 102 within the folds. FIG. 5 discloses the label 100 secured to a box 500, allowing the item (box 500) to be displayed. FIG. 6 discloses a graph 600 showing the differences between the label 100 being folded securing the RFID inlay 102 within, and the label 100 and RFID inlay 102 being secured to a box. Overall, the disclosure of wrapping the RFID inlay around a hole in a label displayed adequate performance. And, using a PET inlay would potentially strengthen the top of the label so it would be less likely to break off. Alternatively, the label (i.e., structure) could be made from a white PET. Furthermore, the label could be produced with a near field loop positioned near the top of the label hole, and a dipole element positioned near a second hole, which would form a long range RFID tag when folded.

The present invention contemplates that the label or tag presently set forth can be utilized not only for accessories, but also small boxed electronics and other potential media articles. For instance, with the label of the present invention if utilized with a belt, the amount of substrate utilized would be decreased. It is also contemplated that the label or tag presently set forth could be utilized I cooperation with a foil folded carton to allow for a RF connection.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A self-adhesive label incorporating an RFID inlay comprising:
    a substrate having a top face with an adhesive layer on the top face such that the substrate has a top section with at least one opening and a bottom section such that the top section has an embedded RFID inlay, where the embedded RFID inlay is positioned near the at least one opening;
    and the top section is folded on itself and the bottom section is not folded on itself leaving an exposed adhesive section on the bottom section that may be adhered to an article.

2. The label of claim 1, wherein the label is manufactured of a rigid polyester.

3. The label of claim 1, wherein the label is manufactured of cardstock.

4. The label of claim 1, wherein the label is manufactured of paper.

5. The label of claim 1, wherein the bottom section is adhered to a package or product and includes a hole that allows the label to be hooked to a display.

6. The label of claim 1, wherein the RFID inlay is secured within the fold of the label when the label is partially folded on itself.

7. The label of claim 1, wherein the substrate is a semi-rigid polyester.

8. The label of claim 1, wherein the label is made using a Cot laser.

9. The label of claim 1, wherein the RFID inlay comprises a chip that is encoded with information relating to the article.

10. The label of claim 1, further comprising at least one set of perforations.

11. The label of claim 10, where the first set of perforations comprises a first perforation in the top section and a second perforation in the bottom section.

12. The label of claim 11, wherein the first perforation is 30 mm from a top perimeter of the tag.

13. The label of claim 1, wherein the label is used for a packaging for an accessory such as a socks, hosiery, underwear, scarves or belts.

14. The label of claim 1, wherein the substrate is printed with graphics or information relating to a retailer, brand owner, or manufacturer of the article.

15. A method of incorporating a RFID inlay into a self adhesive label comprising the steps of:
    providing a substrate with an adhesive layer, where the substrate has a hole suitably sized and shaped for a display,
    cutting the substrate with a laser,
    cutting at least one set of perforations,
    securing a RFID inlay to the substrate by incorporating the RFID inlay into the adhesive layer,
    where the RFID inlay is positioned near the hole, and
    folding the label on itself at the at least one set of perforations to secure the RFID inlay therein; and when the label is folded on itself, an exposed adhesive section is created.

16. The method of claim 15, wherein the substrate has a first and second portion such that the RFID inlay is in the first portion.

* * * * *